United States Patent Office 3,440,294
Patented Apr. 22, 1969

3,440,294
OLIGOMERS OF BICYCLOHEPTADIENE
Roy L. Pruett and Edward A. Rick, Charleston, W. Va., assignors to Union Carbide Corporation, a corporation of New York
No Drawing. Filed Apr. 7, 1967, Ser. No. 629,069
Int. Cl. C07c 13/24
U.S. Cl. 260—666                                    7 Claims

ABSTRACT OF THE DISCLOSURE

A method is described for the manufacture of dimers and trimers of bicycloheptadiene by means of a zero valent nickel catalyst comprising bis(1,5-cyclooctadiene) nickel. The yields of trimer are approximately 6 times those obtained employing prior art catalysts. The formation of trimer in favor of the dimer is suppressed however, by adding triphenyl phosphine to the catalyst. The production of large quantities of trimer is obtained by longer reaction times whereas relatively short reaction times are employed for the production of predominantly dimeric material. The unmodified catalyst favors the production of the exo, trans exo dimer whereas triphenyl phosphine modified catalyst increases the amount of exo, trans endo dimer formed. The examples relate to methods for the manufacture of pentacyclo-$(8.2.1.1^{4,7}.0^{2,9}.0^{3,8})$-tetradeca-5,11-diene (bicycloheptadiene dimer) and octacyclo$(14.2.1.1^{4,13}.1^{7,10}.0^{2,15}.0^{3,14}.0^{5,12}.0^{6,11})$heneicosa-8,17-diene (bicycloheptadiene trimer) from bicycloheptadiene by means of a bis(1,5-cyclooctadiene) nickel catalyst.

---

It is known in the prior art that zero valent group 8 metal complex catalysts may be used for the oligomerization of bicycloheptadiene. For example, Muller et al. described in U.S. Patent 2,282,663 that these complexes may be prepared in situ from phosphine compounds or may be used as preformed materials. Generally, the catalysts are the reaction of a metal derivative such as the acetylacetonates, the diacetyl dioximes, the bis(acrylonitrile) derivatives or the like with a reducing agent such as triethylaluminum. In the latter case, the catalysts are formed in the presence of monomeric bicycloheptadiene.

In French Patent 1,352,206, substantially the same method and catalysts are taught. However, in this patent it is indicated by way of example that the only catalysts successfully employed for the manufacture of the trimer of bicycloheptadiene consists of a zero valent nickel-phosphine complex.

It is one of the objects of the present invention to provide a novel method for the manufacture of the dimers and trimers of bicycloheptadiene. It is a further object of this invention to provide a novel method for the manufacture of the trimers of bicycloheptadiene by means of a zero valent group 8 metal catalyst complex that does not contain phosphorous.

These and other objects have been achieved according to the method of the present invention in which both the dimers and the trimers of bicycloheptadiene are obtained by contacting bicycloheptadiene with a catalyst comprising bis(1,5-cyclooctadiene) nickel.

The dimers of bicycloheptadiene comprise exo, trans, exo pentacyclo$(8.2.1.1^{4,7}.0^{2,9}.0^{3,8})$tetradeca-5,11 - diene and exo, trans, endo pentacyclo$(8.2.1.1^{4,7}.0^{2,9}.0^{3,8})$tetradeca-5,11-diene and will be referred to hereafter for the purpose of the present invention as Dimer I and Dimer II respectively, the steric configuration of both being as follows:

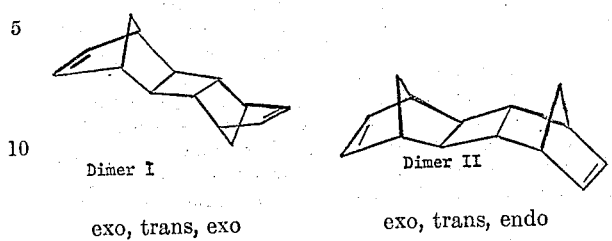

Dimer I
exo, trans, exo

Dimer II
exo, trans, endo

The trimer of bicycloheptadiene comprises octacyclo-$(14.2.1.1^{4,13}.1^{7,10}.0^{2,15}.0^{3,14}.0^{5,12}.0^{6,11})$heneicosa-8,17-diene which may be represented by the formula:

Trimer

There is insufficient evidence at present to assign any specific steric structure to this trimer. It should be noted however that for the purposes of the present invention the trimer referred to herein has a melting point of 201° C.

In another aspect of the present invention it has been discovered that by using the bis(1,5-cyclooctadiene) nickel as a catalyst the dimer can be produced efficiently only when conversion is kept low and unreacted monomer is recycled. In another aspect of the invention it has also been discovered that the production of trimer utilizing bis(1,5-cyclooctadiene) nickel may be minimized when the zero valent nickel catalyst is modified by the addition of small amounts of triphenyl phosphine. The amount of triphenyl phosphine employed in this respect is readily determined by a person having ordinary skill in the art and may be generally defined as an amount sufficient to suppress or substantially suppress the formation of trimer when the reaction is carried to high conversions.

In yet another aspect of the invention it has been discovered that the distribution of isomeric dimers produced by the phosphine modified catalysts is different from that produced by the unmodified bis(1,5-cyclooctadiene) nickel, the latter favoring higher yields of Dimer I whereas the former favors higher yields of Dimer II. In one instance the dimeric fraction obtained using bis(1,5-cyclooctadiene) nickel consisted of 96.5% of Dimer I and 3.5% Dimer II. The dimer obtained using bis-(1,5-cyclooctadiene) nickel modified by the addition of four equivalents of triphenyl phosphine (based on nickel) consisted of 66.1% of Dimer I and 31.7% of Dimer II, and 2.2% of a dimeric product and may be classified as a matter of convenience as Dimer III and is identified as endo, trans, endo-pentacyclo$(8.2.1.1^{4,7}.0^{2,9}.0^{3,8})$tetradeca-5,11-diene.

Although the preferred catalyst according to the invention comprises bis(1,5-cyclooctadiene) nickel, other olefinic materials are suggested as alternate ligands. Diolefinic materials which can serve as bidentate ligands should prove particularly suitable, and would include, for example, cyclooctatetraene, bicycloheptadiene, and 1,4-cyclohexadiene. The preferred zero valent nickel catalysts suggest the use of group 8 metals in general, especially iron and cobalt in addition to nickel and any combination thereof as well as ruthenium, rhodium, palladium, osmium, iridium and platinum as well as any combination thereof. Triphenyl phosphine is the preferred phosphine compound for modifying the catalyst although other compounds are suggested such as other phosphines, phosphites, phosphinites and phosphonites.

The oligomerization reactions may be conducted at from about 0° C. to about 250° C., especially about 20° C. to about 200° C. and preferably from about 20° C. to about 150° C. at atmospheric, superatmospheric or subatmospheric pressures and for a length of time sufficient to produce the dimer and/or trimer. The reaction conditions are generally a matter that may be easily determined by a person having ordinary skill in the art.

The mole ratios of bicycloheptadiene to either the bis-(1,5-cyclooctadiene) nickel catalyst or the triphenyl phosphine modified catalyst may vary from about 10 to about 200,000, especially about 25 to about 100,000 and preferably from about 50 to about 20,000 moles per mole of catalyst.

Although the inventor does not wish to be limited by any theory, it may be hypothesized that the mechanism of bicycloheptadiene oligomerization proceeds by the attack of uncomplexed monomeric or dimeric bicycloheptadiene on a bicycloheptadiene which is activated by being complexed with a zero valent nickel species. Furthermore, it may be proposed that the electronic and steric nature of the other ligands (L) attached to the nickel may control the stereo chemistry of the product as well as the degree of oligomerization obtained. The following mechanism is suggested in this regard:

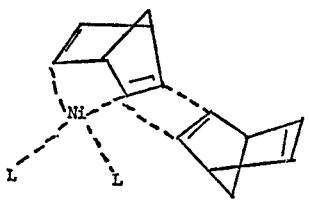

The following non limiting examples are included as some specific embodiments of the invention.

EXAMPLE I

Dioxane (500 g.), bicycloheptadiene (500 g.) and bis-(1,5-cyclooctadiene) nickel (5 g.) are charged to a stirred flask under a nitrogen atmosphere. The resulting mixture rapidly turns a deep red-brown color and exhibits a mild exotherm. The mixture is stirred for twenty-two hours at room temperature and then an additional 500 g. of bicycloheptadiene is added. The reaction mixture is then heated to 50° C. and maintained at that temperature for eighteen hours. Additional catalyst (3.97 g.) is then added and the mixture heated a final nineteen hours at 50° C. Dioxane and unreacted bicycloheptadiene are removed by distillation under reduced pressure. Fractional recrystallization of the residue from ethanol, followed by sublimation of the dimer affords 413 g. of dimer, 301 g. of trimer (M.P. 201° C.) and 42 g. of higher polymeric material.

Analysis of the dimeric fraction by vapour phase chromatography shows it to contain 96.5 percent Dimer I and 3.5 percent Dimer II. The dimers are separated and isolated with the aid of a preparative vapor phase chromatograph. Comparison of their NMR spectra with those of authentic samples reveal that Dimer I was the exo, trans, exo-isomer (M.P. 67–68° C. and Dimer II was the exo, trans, endo-isomer liquid at room temperature).

EXAMPLE II

Bicycloheptadiene (600 g.) and bis(1,5-cyclooctadiene) nickel (12 g.) are charged to a stirred flask under a nitrogen atmosphere and the mixture slowly heated to 60° C.

The progress of the reaction is followed by vapor phase chromatography.

TABLE I

| R.action time (min.) | Ratio dimer/monomer | Ratio dimer/trimer |
|---|---|---|
| 37 | .013/1 | |
| 100 | .965/1 | |
| 165 | 0.14/1 | 71/1 |
| 187 | 0.18/1 | 62/1 |
| 245 | 0.38/1 | 27/1 |
| 270 | 0.44/1 | 24/1 |
| 314 | 9.53/1 | 13/1 |
| 370 | 0.75/1 | 10/1 |

The reaction mixture is allowed to stand overnight at room temperature and then heated an additional 7.5 hours at 60° C. Distillation of the crude product gives 363 grams of dimer (B.P. 124° C./15 mm.). The residue is then sublimed to give 163 grams of trimer. Thus the final Dimer/Trimer ratio is 2.2/1.

EXAMPLE III

Bicycloheptadiene (1000 g.), bis(1,5-cyclooctadiene) nickel (0.018 mole), triphenylphosphine (0.146 mole) and dioxane (500 g.) are charged to a stirred flask under a nitrogen atmosphere. The reaction mixture is heated to 80° C. and maintained at that temperature for twenty-two hours. Examination of the reaction mixture by vapor phase chromatography at the end of this period reveals that no dimerization had occurred.

An additional portion (0.018 mole) of bis(1,5-cyclooctadiene) nickel is added to bring the molar ratio of triphenylphosphine to bis(1,5-cyclooctadiene) nickel to four to one. The reaction mixture is then heated an additional 125 hours at 80° C. Dimer formation begins almost immediately but the reaction appears to be relatively slow under these conditions. Distillation of the reaction product gives 540 g. of bicycloheptadiene and 285 g. of dimer. Attempts to recrystallize the distillation residue gives only 4 g. of the trimer.

Analysis of the distilled dimer by vapor phase chromatography shows it to be 66.1% exo, trans, exo dimer, 31.7% exo, trans, endo dimer and 2.2% of endo, trans, endo, pentacyclo[8.2.1.1$^{4,7}$.0$^{2,9}$.0$^{3,8}$]tetradeca-5,11-diene.

The results of Example III indicate that after the ratio of bis(1,5-cyclooctadiene) nickel to triphenylphosphine is raised to 4:1 dimerization begins, though at a relatively low reaction rate. In comparing Examples I and III, the analyses of the dimers obtained also indicate that unmodified bis(1,5-cyclooctadiene) nickel favors the formation of Dimer I whereas the triphenylphosphine modified catalyst increases the amount of Dimer II. It should also be noted in Example III that after relatively long reaction rates the formation of trimer was relatively low which indicates the effectiveness of triphenylphosphine modified catalyst in suppressing the rate and quantity of bicycloheptadiene trimer formed.

Substantially the same results are obtained when the process variables noted herein and various combinations thereof are employed according to the method of the present invention.

The dimer and/or trimer and mixtures thereof are useful in the formation of polymeric compositions either by direct polymerization by means of a free radical type of catalyst or by epoxidizing the dimer and/or trimer by means of peracetic acid followed by the formation of a polymer by subsequent raction with a polyfunctional organic carboxylic acid or amine according to methods well known in the art. The resins thus formed may be employed in potting, encapsulation, coating and laminating applications according to methods which are well known in the art.

Thus there has been disclosed a novel method for the oligomerization of bicycloheptadiene, one aspect of which comprises forming substantial amounts of bicycloheptadiene trimer by means of a catalyst comprising bis(1,5-cyclooctadiene) nickel. This catalyst may also be modified by triphenylphosphine and when employed in the oligomerization of bicycloheptadiene trimer formation is suppressed and exo, trans, endo dimer is formed in increased yields.

Although the invention has been described by reference to one or more embodiments it is not intended that the broad scope of the novel method for the oligomerization of bicycloheptadiene in the presence of catalyst comprising bis(1,5-cyclooctadiene) nickel be limited thereby but that certain modifications are intended to be included within the spirit and the broad scope of the following claims.

What is claimed is:

1. A method for the manufacture of oligomers of bicycloheptadiene comprising contacting bicycloheptadiene with a catalyst comprising bis(1,5-cyclooctadiene) nickel for a length of time sufficient to form exo, trans, exo-pentacyclo(8.2.1.1$^{4,7}$.0$^{2,9}$.0$^{3,8}$)tetradeca - 5,11 - diene, exo, trans, endo-pentacyclo(8.2.1.1$^{4,7}$.0$^{2,9}$.0$^{3,8}$)tetradeca - 5,11-diene and octacyclo(14.2.1.1$^{4,13}$.1$^{7,10}$.0$^{2,15}$.0$^{3,14}$.0$^{5,12}$.0$^{6,11}$)-heneicosa-8,17-diene.

2. The method of claim 1 where said catalyst consists essentially of bis(1,5-cyclooctadiene) nickel.

3. The method of claim 1 where said catalyst consists essentially of bis(1,5-cyclooctadiene) nickel modified by triphenylphosphine, the molar ratio of triphenylphosphine to bis(1,5-cyclooctadiene) nickel being up to about 4:1.

4. In the oligomerization of bicycloheptadiene the improvement comprising contacting bicycloheptadiene with bis(1,5-cyclooctadiene) nickel for a length of time sufficient to obtain high yields of octacyclo(14.2.1.1$^{4,13}$.1$^{7,10}$.0$^{2,15}$.0$^{3,14}$.0$^{5,12}$.0$^{6,11}$)heneicosa-8,17-diene trimer.

5. In the oligomerization of bicycloheptadiene the improvement comprising contacting bicycloheptadiene with a catalyst consisting essentially of bis(1,5-cyclooctadiene) nickel for a length of time sufficient to obtain substantially exo, trans, exo - pentacyclo(8.2.1.1$^{4,7}$.0$^{2,9}$.0$^{3,8}$)tetradeca-5,11-diene and lesser amounts of exo, trans, endo pentacyclo(8.2.1.1$^{4,7}$.0$^{2,9}$.0$^{3,8}$)tetradeca-5,11-diene and octacyclo-(14.2.1.1$^{4,13}$.1$^{7,10}$.0$^{2,15}$.0$^{3,14}$.0$^{5,12}$.0$^{6,11}$)heneicosa-8,17-diene.

6. In the method for the production of oligomers of bicycloheptadiene, the improvement comprising suppressing the formation of bicycloheptadiene trimers and increasing the yields of exo, trans, endo pentacyclo(8.2.1.1$^{4,7}$.0$^{2,9}$.0$^{3,8}$)tetradeca-5,11-diene by means of a bis(1,5-cyclooctadiene) nickel catalyst comprising modifying said catalyst with triphenylphosphine to obtain a modified catalyst and reacting said bicycloheptadiene in the presence of said modified catalyst.

7. The method of claim 6 where the molar ratio of triphenylphosphine to bis(1,5-cyclooctadiene) nickel is up to about 4:1.

References Cited

UNITED STATES PATENTS

| 3,265,749 | 8/1966 | Cannell | 260—666 |
| 3,261,875 | 7/1966 | Pruett | 260—666 |
| 3,258,502 | 6/1966 | Cannell | 260—666 |
| 3,258,501 | 6/1966 | Cannell | 260—666 |
| 3,377,398 | 4/1968 | Zoche | 260—666 |

FOREIGN PATENTS

| 626,407 | 6/1963 | Belgium. |
| 1,197,083 | 7/1965 | Germany. |

DELBERT E. GANTZ, *Primary Examiner.*

V. O'KEEFE, *Assistant Examiner.*